Figure 1:
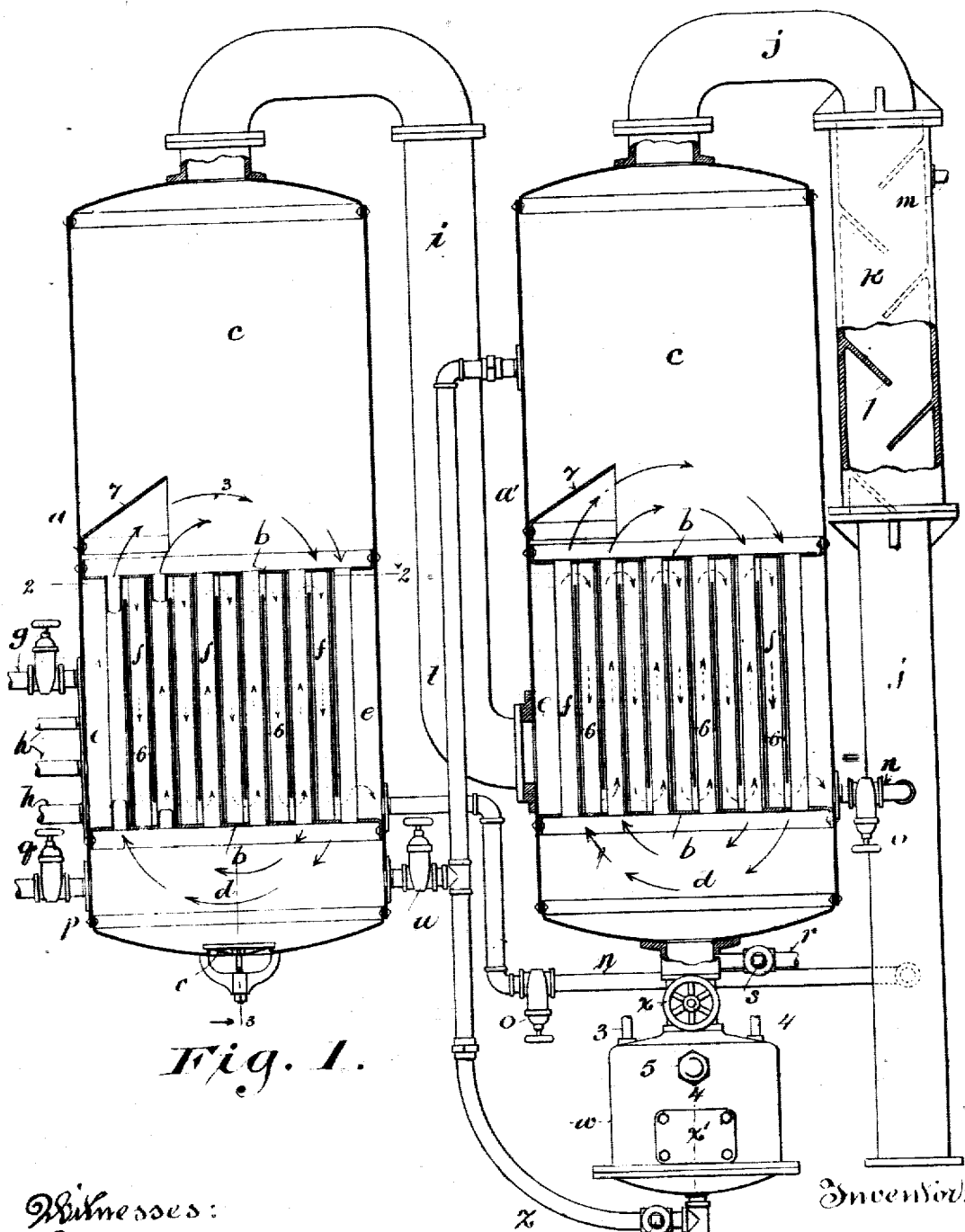

No. 794,831. PATENTED JULY 18, 1905.
J. ABRAHAM.
VACUUM PAN.
APPLICATION FILED AUG. 18, 1904.
2 SHEETS—SHEET 2.
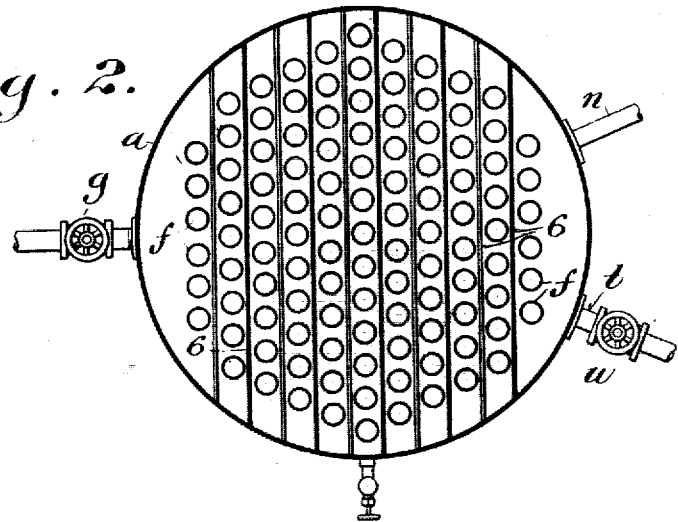
Fig. 2.
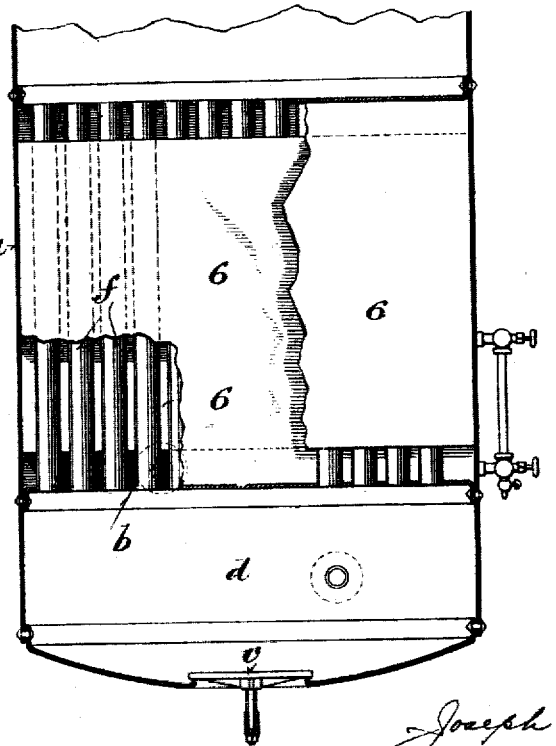
Fig. 3.
Fig. 4.
Witnesses:
Geo. W. Young.
Chas. L. Goss
Inventor:
Joseph Abraham,
By Winkler Flanders Smith Bottum & Vilas
Attorneys.

No. 794,831.

Patented July 18, 1905.

UNITED STATES PATENT OFFICE.

JOSEPH ABRAHAM, OF MILWAUKEE, WISCONSIN, ASSIGNOR TO MILWAUKEE EVAPORATOR COMPANY, OF MILWAUKEE, WISCONSIN, A CORPORATION OF WISCONSIN.

VACUUM-PAN.

SPECIFICATION forming part of Letters Patent No. 794,831, dated July 18, 1905.

Application filed August 18, 1904. Serial No. 221,223.

*To all whom it may concern:*

Be it known that I, JOSEPH ABRAHAM, a subject of the King of Great Britain, residing at Milwaukee, in the county of Milwaukee and State of Wisconsin, have invented certain new and useful Improvements in Evaporating Apparatus, of which the following is a specification, reference being had to the accompanying drawings, forming a part thereof.

This invention relates more particularly to vacuum-evaporators and may be embodied in single or multiple effect apparatus for treating waste soap-lye to recover glycerin and salt or for condensing or treating various other solutions to obtain various substances they may contain in a dry or concentrated state. Its main objects are to economize heat, accelerate the circulation and evaporation of the solution or liquid to be evaporated, and generally to improve the construction and operation of apparatus of this class.

It consists in certain novel features of construction and in the peculiar arrangement and combinations of parts, as hereinafter particularly described, and pointed out in the claims.

In the accompanying drawings like characters designate the same parts in the several figures.

Figure 1 is a vertical section and front elevation of a double-effect evaporating apparatus embodying the invention. Fig. 2 is an enlarged horizontal section on the line 2 2, Fig. 1, of one of the evaporators. Fig. 3 is an enlarged vertical section on the line 3 3, Fig. 1, and Fig. 4 is an enlarged vertical section on the line 4 4, Fig. 1, of a portion of the trap connected with the last evaporator.

For the purpose of illustration the invention is shown as embodied in a double-effect apparatus; but it may be embodied in single or multiple effect apparatus comprising a single evaporating drum or vessel or any desired number of such drums or vessels connected in series.

Referring to the drawings, $a$ $a'$ designate two drums or vessels preferably cylindrical in form and arranged vertically, as shown in Fig. 1. They may be conveniently constructed, like steam-boilers, of sheet-metal plates riveted together. Each drum or vessel is divided by horizontal partitions or tube-plates $b$ $b$ into an evaporating-chamber $c$ at the upper end, a settling-chamber $d$ at the lower end, and an intermediate heating-chamber $e$.

$f f$ are vertical tubes passing through the heating-chambers $e$, secured at their ends in the plates $b$ and opening into the chambers $c$ and $d$. The heating-chamber $e$ of the first-effect evaporator $a$ has on one side a valve-controlled live-steam-supply connection $g$ and one or more exhaust-steam-supply connections $h$ $h$ when exhaust-steam is available for the operation of the apparatus. The evaporating-chamber $c$ of the vessel $a$ is connected at the top by a pipe $i$ with the heating-chamber of the vessel $a'$, and an exhaust-pipe $j$ connects the top of the evaporating-chamber $c$ of vessel $a'$ with a vacuum-pump. (Not shown.) In the exhaust-pipe $j$ a condenser is provided consisting of a vertically-arranged case $k$ of somewhat greater diameter than said pipe, having alternating deflecting and spraying plates $l$ projecting inwardly and downwardly from opposite walls thereof, and a water-supply connection $m$, leading into the upper part of the case, as shown in Fig. 1.

On the sides opposite their heat-supply connections the heating-chambers $e$ are connected with the exhaust-pipe $j$ below the condenser by pipes $n$ $n$, provided with valves $o$ $o$.

A pipe $p$, provided with a valve $q$, connects with the settling-chamber $d$ of the first-effect evaporator for supplying thereto the solution or liquid to be evaporated, and a pipe $r$, provided with a valve $s$, connects with the bottom of the settling-chamber $d$ at the lower end of the last-effect evaporator for drawing off the condensed liquid.

A pipe $t$, provided with a valve $u$, connects the settling-chamber $d$ of vessel $a$ with the evaporating-chamber $c$ of vessel $a'$.

The bottom or lower end of vessel $a$ has an opening which is closed by a removable cover or plate $v$, and with the bottom or lower end of the vessel $a'$ a trap $w$ is connected, the connection between it and said vessel being provided with a valve $x$. This trap has in one side an opening which is closed by a removable plate or cover $x'$ and is provided below said opening, as shown in Fig. 4, with a strainer $y$, which may be constructed of layers of sacking or other suitable fibrous material held between perforated metal plates or screens. The bottom of the trap is connected below this strainer by a pipe $z$, having a valve 2, with the pipe $t$ leading into the evaporating-chamber $c$ of vessel $a'$. This connection may, however, be made independently of the connection between the settling-chamber $d$ of vessel $a$ and the evaporating-chamber of vessel $a'$. Steam or other supply pipes 3 and 4 are preferably connected with the upper part of the trap, which is also preferably provided with a sight-glass 5 for observing the nature and condition of its contents.

To utilize to the fullest degree the heat contained in the steam or other heating medium supplied to the apparatus and to accelerate the circulation and evaporation of the solution or liquid to be evaporated, baffle-plates 6 are provided between the several rows of tubes $f$, which are arranged crosswise of the heating-chambers $e$ between their heat-supply and outlet connections. These plates terminate alternately at their upper and lower edges short of the tube-plates $b$, to which they are attached at their other edges, thereby forming zigzag or sinuous passages for the heating medium running lengthwise of the tubes.

Deflecting-plates 7 7, attached to the walls of the vessels $a$ $a'$, project inwardly therefrom over the upper ends of the tubes $f$ nearest the heat-supply connections.

My improved apparatus operates as follows: The vessels $a$ $a'$ being supplied with solution or liquid to be evaporated, steam is admitted to the heating-chamber $e$ of vessel $a$ through one or more of the supply connections $g$ and $h$, the upper part of the vessel $c$ is exhausted by the operation of the vacuum-pump connected therewith through the pipe $j$ and the condenser, and the valve $u$ is adjusted to maintain a higher or stronger vacuum in vessel $a'$ than in vessel $a$, according to the usual practice in multiple-effect apparatus of this class. The steam entering the first heating-chamber flows back and forth lengthwise of and in contact with the tubes $f$ between the baffle-plates 6, rapidly giving up its heat to said tubes and the solution or liquid contained therein and finally escapes from the opposite side of said chamber through the pipe $n$ into the main exhaust-pipe $j$. The steam traversing the tubes $f$ their entire length rapidly communicates its heat thereto and is nearly, if not completely, spent before it reaches the last rows of tubes. The first rows of tubes being thus subjected to the greatest heat, a strong upward current of the solution or liquid is induced through them, resulting in a downward current through the cooler tubes toward the opposite side of the chamber and a rapid circulation of the solution back and forth between the evaporating and settling chambers $c$ and $d$, as indicated by the full-line arrows on Fig. 1. The sinuous course of the steam in its passage through the heating-chamber $e$ is indicated by dotted arrows on Fig. 1. The steam or hot vapor generated in the first-effect evaporator is conducted through the pipe $i$ into the heating-chamber of the second-effect evaporator and passes in like manner in a zigzag or sinuous course along the tubes $f$ between the baffle-plates 6 in its heating-chamber $e$, escaping therefrom in a spent condition through the pipe $n$ into the main exhaust-pipe $j$. The lower boiling-point of the solution or liquid in the vessel $a'$, by reason of the higher or stronger vacuum maintained therein, admits of employing the steam or vapor produced by the evaporation of the solution or liquid in the preceding vessel as the heating medium for the last or next vessel. The denser part of the solution or liquid in the first vessel $a$ is drawn from the settling-chamber $d$ through the pipe $t$ into the evaporating-chamber $c$ of vessel $a'$, and the condensed liquid settling in chamber $d$ of vessel $a'$ is drawn off from time to time through the pipe $r$. Solid matter, such as salt, in the treatment of waste soap-lye precipitated in the settling-chamber $d$ of the last-effect evaporator is swept by the circulation of the solution in its passage through said chamber into the trap $w$, the valve $x$ being left wide open. When a sufficient quantity of salt or other solid matter has accumulated in the trap, as observed through the sight-glass 5, the valves $u$ and $x$ are closed and the valve 2 is opened, thus permitting the high vacuum maintained in chamber $c$ to draw the liquid from the salt or other solid matter through the strainer $y$ back into said chamber. The valve 2 is now closed, the cover $x'$ removed, and the salt or other matter withdrawn from the trap. If necessary or desirable, the salt or other matter caught in the trap $w$ may be washed or cleansed before its removal therefrom by the admission of steam or water through the connection 3 or 4. The steam or vapor produced by evaporation in the second or last chamber $c$, escaping through the pipe $j$ into the upper end of the condenser, is directed back and forth by the plates $l$ and mingled with the cool water supplied to the condenser through the pipe $m$ and beaten into a spray by its projection against said plates. The steam or vapor being thus rapidly condensed helps to produce and maintain the high vacuum required in the last evaporator.

The circulation of steam and the relative temperatures produced and maintained in the heating-chambers e of the two or several connected evaporators are governed by the valves o in the exhaust connections and by the valve g in the main supply connection. The relative degrees of vacuum maintained in the evaporating-chambers are controlled by the valve o of the last evaporator and by the valve u, as well as by the operation of the vacuum-pump connected with the exhaust-pipe j and the regulation of the cool injection-water to the condenser through the pipe m.

Various changes in the details of construction and in the arrangement of parts may be made without departing from the principle and intended scope of the invention.

I claim—

1. In evaporating apparatus the combination of a closed vessel having a heating-chamber between evaporating and settling chambers, tubes passing through the heating-chamber and opening at the ends into the evaporating and settling chambers, inlet and outlet connections with opposite sides of the heating-chamber for the heating medium, and baffle-plates extending transversely across said heating-chamber between its inlet and outlet connections and between the rows of tubes therein and terminating alternately short of the partitions at opposite ends of said tubes, thereby forming a zigzag passage for the heating medium back and forth lengthwise of the tubes, substantially as described.

2. In evaporating apparatus the combination of a closed vessel divided by horizontal tube-plates into evaporating, heating and settling chambers, inlet and outlet connections with opposite sides of said heating-chamber for the heating medium, tubes passing vertically through said heating-chamber and opening at the ends into the evaporating and settling chambers, baffle-plates extending across the heating-chamber between its inlet and outlet connections and between successive rows of tubes and terminating alternately short of the upper and lower tube plates, and a deflector projecting into the evaporating-chamber over the upper ends of the tubes nearest the inlet connection, substantially as described.

3. In evaporating apparatus the combination of a closed vessel having evaporating, heating and settling chambers, connections with opposite sides of the heating-chamber for admission and discharge of the heating medium, tubes passing through said heating-chamber and opening at the ends into the evaporating and settling chambers, baffle-plates extending across the heating-chamber between its inlet and outlet connections and between successive rows of tubes and terminating alternately short of the top and bottom walls of said chamber, and an exhaust connection leading out of said evaporating-chamber, substantially as described.

4. In evaporating apparatus the combination of a closed vessel divided by horizontal tube-plates into evaporating, heating and settling chambers, tubes passing vertically through the heating-chamber and opening at their upper ends into the evaporating-chamber and at their lower ends into the settling-chamber, an exhaust connection leading out of the upper part of the evaporating-chamber, inlet and outlet connections for the heating medium on opposite sides of the heating-chamber, valve-controlled liquid supply and discharge connections leading into and out of said vessel, and vertical baffle-plates extending across the heating-chamber between its inlet and outlet connections and between successive rows of tubes and terminating alternately short of the upper and lower tube-plates, thereby forming a zigzag passage for the heating medium up and down along said tubes, substantially as described.

5. In evaporating apparatus the combination of a number of closed vessels each divided by horizontal tube-plates into evaporating, heating and settling chambers, tubes passing vertically through the heating-chambers and opening at their upper ends into the evaporating-chambers and at their lower ends into the settling-chambers, an exhaust connection leading out of the upper part of the last evaporating-chamber, a connection leading from the upper part of the evaporating-chamber of each preceding vessel into the heating-chamber of the next succeeding vessel, a connection with the heating-chamber of the first vessel for supplying a heating medium thereto, valve-controlled outlet connections with the heating-chambers opposite their heat-supply connections, a valve-controlled connection leading from the settling-chamber of each preceding vessel into the evaporating-chamber of the next vessel, and vertical baffle-plates extending across the heating-chambers between their heat supply and outlet connections and between successive rows of tubes and terminating alternately at their upper and lower edges short of said tube-plates, substantially as described.

6. In evaporating apparatus the combination of a number of closed vessels each divided horizontally by plates into evaporating, heating and settling chambers, tubes passing vertically through the heating-chambers and opening at their upper ends into the evaporating-chambers and at their lower ends into the settling-chambers, an exhaust connection comprising a condenser leading out of the upper part of the last evaporating-chamber, a connection leading from the upper part of the evaporating-chamber of each preceding vessel into the heating-chamber of the next succeeding vessel, a valve-controlled heat-supply connection with the first heating-chamber, valve-controlled outlet connections for the several heating-chambers, a valve-controlled connection leading from the settling-chamber of each preceding vessel into the evaporating-chamber of the next succeeding vessel, valve-controlled liquid supply and discharge connections with the settling-chambers of the first and last vessels respectively, and a trap provided with a strainer and having a valve-controlled connection above the strainer with the settling-chamber and a valve-controlled connection below the strainer with the evaporating-chamber of the last vessel, substantially as described.

In witness whereof I hereto affix my signature in presence of two witnesses.

JOSEPH ABRAHAM.

Witnesses:
CHAS. L. GOSS,
BERNARD C. ROLOFF.